Figure 1:
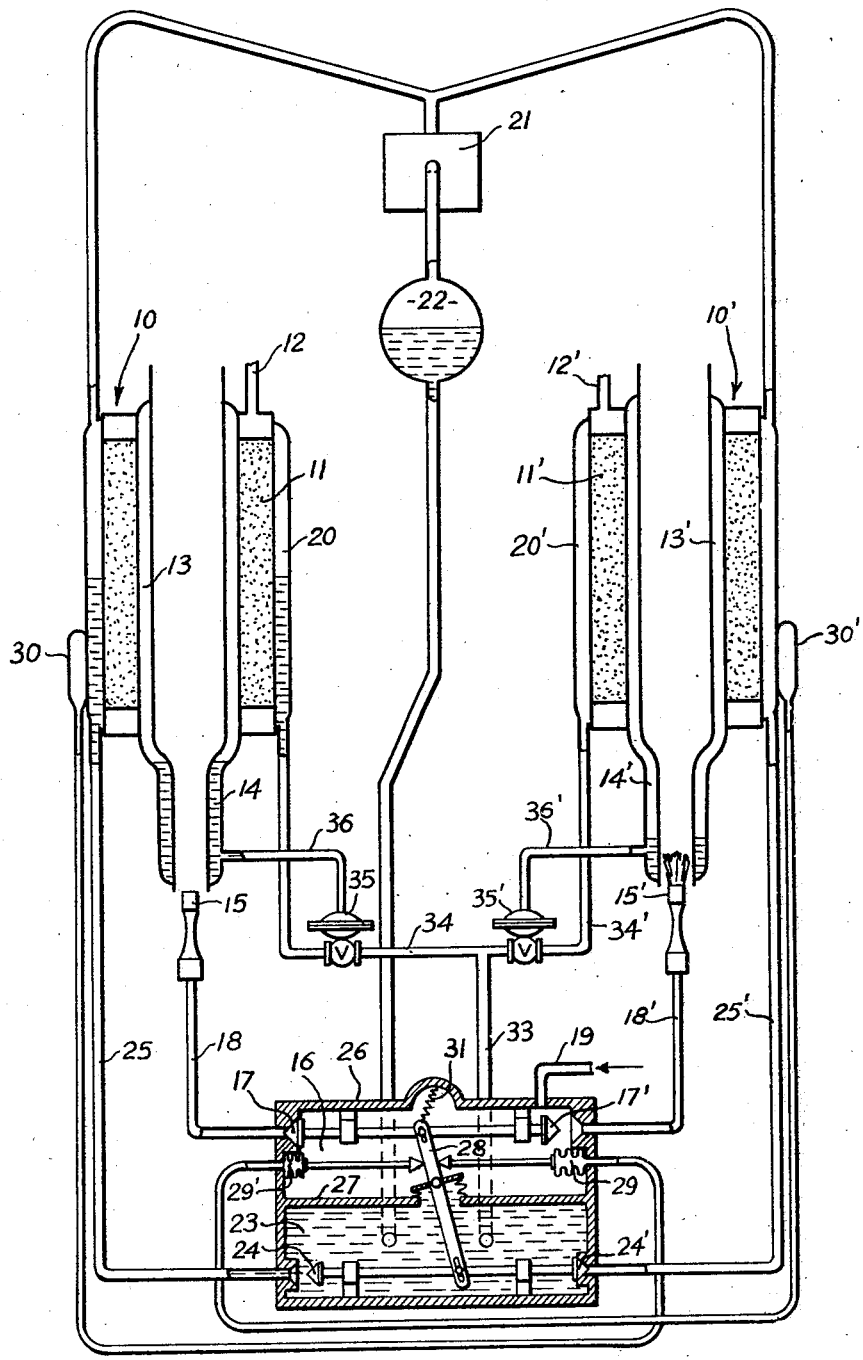

FIG. I.

March 6, 1945. N. ERLAND AF KLEEN 2,370,643
REFRIGERATION APPARATUS OF THE INTERMITTENT
ABSORPTION OR ADSORPTION TYPE
Filed May 11, 1942 2 Sheets-Sheet 2

INVENTOR.
NILS ERLAND AF KLEEN
BY
C. P. Goepel
ATTORNEY

Patented Mar. 6, 1945

2,370,643

UNITED STATES PATENT OFFICE 2,370,643

REFRIGERATION APPARATUS OF THE INTERMITTENT ABSORPTION OR ADSORPTION TYPE

Nils Erland af Kleen, Stockholm, Sweden, assignor to Kleen Refrigerator, Inc., Hoboken, N. J., a corporation of Delaware Application May 11, 1942, Serial No. 442,416

14 Claims. (Cl. 62—5)

This invention relates to new and useful improvements in refrigerating apparatus of the intermittent absorption or adsorption type having two or more units operating in phase relation to each other and is directed more particularly to means for preventing overheating of the boiler-absorbers or boiler-adsorbers of the units.

For convenience, the invention will be described in connection with intermittent absorption refrigerating apparatus but it is to be understood that the use of the expressions "absorption," "absorbent" and "absorber" in the following description and in the appended claims, is intended to include the corresponding expressions "adsorption," "adsorbent" and "adsorber" for intermittent adsorption refrigerating apparatus.

In this type of refrigerating apparatus, in order to automatically control the operation thereof, that is, the periods of generation and of absorption of each of two or more units working in phase relationship, a thermostat control mechanism is employed responsive to the temperature in each of the boiler-absorbers and operable intermittently at a predetermined temperature attained during the generating periods of each of the units, respectively. However, should the thermostat control mechanism fail for some reason or other to "switch over" the heat supply from one boiler-absorber to the other when the predetermined temperature is reached, the heat will then be supplied continuously to one boiler-absorber with the result that the temperature in the latter will continue to rise and might in time decompose the refrigerant. Moreover, the excessive heat supplied to the boiler-absorber will create a very serious fire hazard.

It is therefore one of the primary objects of the present invention to overcome the above noted dangerous conditions by employing auxiliary control means operable independently of the thermostat control mechanism.

Another object of the invention is to prevent overheating of the boiler absorbers of two or more intermittent absorption systems operating in phase relationship by circulating a heat transferring medium in heat exchange relation with each of the boiler-absorbers independently of the thermostat control mechanism.

A further object of the invention is to prevent overheating of the boiler-absorbers of two or more intermittent absorption systems operating in phase relationship by shutting off the heat supply at a predetermined temperature attained in any one of the boiler-absorbers independent of the thermostat control mechanism.

A still further object of the invention is to heat the boiler-absorbers of two or more intermittent absorption systems and to prevent overheating of said boiler-absorbers in the event of failure of the thermostat control mechanism to shut off the heat supply, by establishing communication between each of the separate heat transferring systems.

The invention further consists in auxiliary means operating independently of the thermostat control mechanism for two or more intermittent absorption refrigerating units working in phase relation to each other, to permit circulation of a heat transferring medium in heat exchange relation with each of the boiler-absorbers simultaneously, to take away excessive heat from any of said boiler-absorbers, or to shut off the heat supply to the boiler-absorber being heated.

With the above and other objects in view which will appear as the description proceeds, my invention resides in any other novel features hereinafter more fully described, illustrated by way of example in the accompanying drawings, and more particularly pointed out in the annexed claims.

Referring to the drawings in which numerals of like character designate similar parts throughout the various views—

Figure 2:
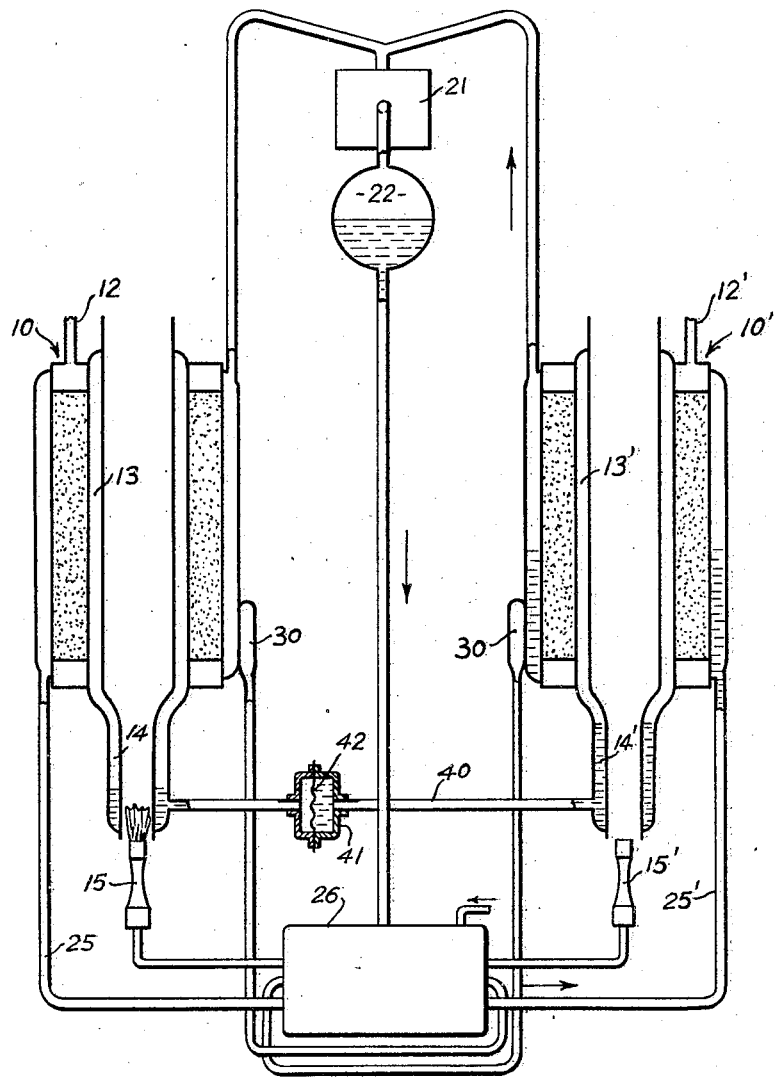
Figure 3:
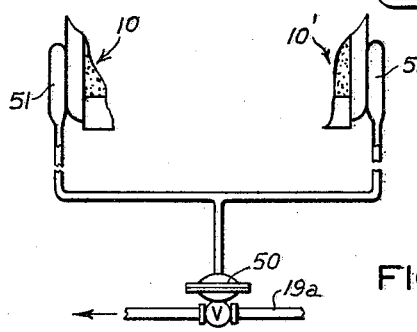

Fig. 1 is a diagrammatic view of the heating and cooling means for the boiler-absorbers of two intermittent absorption refrigerating systems operating in phase relation to each other and controlled by the usual thermostat changing-over mechanism shown in section and illustrating one form of auxiliary control means for preventing overheating of either of the boiler-absorbers in the event of failure of the changing-over mechanism to "switch over" the heat;

Fig. 2 is a similar view showing another form of auxiliary control to prevent overheating of either of the boiler-absorbers, and Fig. 3 is a detailed view of a further modification of auxiliary control.

Referring first to Fig. 1 of the drawings, 10 and 10' represent generally the boiler-absorbers of two intermittent absorption refrigerating units operating in phase relation to each other and each provided with an absorbent chamber 11, 11' in fluid communication by means of conduit 12, 12' with the condensing and evaporating parts (not shown) of the corresponding units. During the generating periods of each unit, the corresponding boiler-absorber 10, 10' is adapted to be heated and for this purpose there is shown a heat transfer system in the form of an annular jacket 13, 13' arranged in heat exchange relation with the absorbent chamber 11, 11' and having a reduced neck portion 14, 14' extending outwardly beyond one end of the absorbent chamber to system upon application of heat thereto by any suitable heating means such as a fuel burner 15, 15' as more fully disclosed in my co-pending application, Serial No. 427,261, filed January 19, 1942.

Each of the burners 15 and 15' is in fluid communication with a fuel valve chamber 16 having valves 17 and 17', the former controlling the admission of fuel to burner 15 through conduit 18 and the latter controlling the admission of fuel to burner 15' through conduit 18'. Fuel is admitted to the valve chamber 16 by way of inlet pipe 19 leading from a suitable source (not shown).

For cooling the boiler-absorbers during the absorbing periods of the corresponding units, there is shown a secondary cooling system formed by a plurality of interconnected elements including jackets 20 and 20' in heat exchange relation with the absorbent chambers 11 and 11', respectively, condenser 21, liquid collecting vessel 22 and valve chamber 23 having valves 24 and 24', the former controlling the circulation of the cooling medium to the jacket 20 through conduit 25, and the latter controlling the circulation of the cooling medium to the jacket 20' through conduit 25'.

The two valve chambers 16 and 23 are conveniently housed in a common casing or housing 26 but separated from each other by dividing partition 27 provided with a sealed opening to accommodate a controlling member 28 operatively connected at one end to the valves 17 and 17' in the chamber 16 and similarly connected at its other end to the valves 24 and 24' in the chamber 23. Thermostat bellows 29 and 29' responsive to the temperature in the boiler-absorbers 10 and 10', respectively, by means of the thermostat bulbs 30 and 30', cooperate with the controlling member 28 to move the latter from one operating position to the other and vice versa, and a snap spring device 31 cooperates with said controlling member to yieldably maintain the latter in either of its operating positions.

During the operation of the installation just described, with the controlling member 28 occupying the position shown, fuel valve 17' is open to render burner 15' active and valve 24' is closed to prevent circulation of the secondary cooling medium through the jacket 20', while fuel valve 17 is closed to render the burner 15 inactive and valve 24 is open to permit circulation of the secondary cooling medium through the jacket 20, so that the right hand unit is generating while the left hand unit is absorbing. When the temperature in the boiler-absorber 10' reaches a predetermined maximum, the thermostat bellows 29' will move the controlling member 28 to its opposite operating position closing fuel valve 17' and valve 24 and simultaneously opening fuel valve 17 and valve 24' so that the left hand unit will now be generating while the right hand unit will be absorbing.

In the event the control mechanism should fail to operate at a predetermined maximum temperature, heat would be supplied continuously to one boiler-absorber and the temperature therein would continue to rise beyond the said predetermined maximum and in time would reach such a point that decomposition of the refrigerant would take place and in order to overcome this condition, I provide an auxiliary safety control in the form of a by-pass conduit 33 for the flow of the cooling medium from the valve chamber 23 to the cooling jackets 20 and 20' by way of branch conduits 34 and 34', respectively. Interposed in each branch conduit is a separate diaphragm valve 35, 35' normally closed, but adapted to be opened in response to a predetermined pressure in the heat transfer system of the corresponding boiler-absorber by way of conduit 36, 36'.

Thus, as one boiler-absorber is heated, the pressure in the heat transfer system thereof will increase in accordance with the temperature rise and when the pressure reaches a predetermined value, the associated valve 35 or 35' will be opened to permit the secondary cooling medium from the valve chamber 23 to circulate through the corresponding cooling jacket by way of conduit 33 and branch conduit 36 or 36' simultaneously with the circulation through the cooling jacket of the other boiler-absorber through conduit 25 or 25'. In this manner, should the thermostat control in housing 26 fail to operate at the predetermined temperature, the temperature in the boiler-absorber being heated will not reach the danger point previously mentioned for the reason that the secondary cooling medium will take away the excess heat and dissipate such heat through the condenser 21.

The heating and cooling installation shown in Fig. 2, together with the control mechanism therefor is similar to that just described in connection with Fig. 1. However, instead of employing the secondary cooling medium to prevent overheating of each boiler-absorber, the heat transferring medium of the heat transfer systems is employed by connecting such heat transfer systems through conduit 40 having interposed therein a chamber 41 provided with a frangible disc or membrane 42 which normally maintains the heat transfer systems separate from one another, that is, out of communication with each other, but which will operate to establish communication between the two heat transferring systems when the pressure in either of said systems increases beyond a predetermined value. The disc or membrane 42 is preferably composed of insulating material to prevent transmission of heat from one system to the other, or, instead of a single disc or membrane, the chamber 40 may be provided with two spaced apart membranes separated by a suitable inert gas such as nitrogen or the like which will not affect the operation of the heat transfer systems.

In this form of the invention, during the normal operation of the control device in the housing 26, the two heat transfer systems will be maintained out of communication with each other by the frangible disc 42 and each will operate intermittently and in phase relation to the other to transfer the heat from the associated burner 15, 15' to the corresponding absorbent chamber 11, 11'. However, if the control device fails to operate at the predetermined temperature, the increased pressure in the heat transfer system of the boiler-absorber being heated due to the excessive heat, will break the disc or membrane 42 and the heat transferring medium will flow from one jacket to the other, and since one boiler-absorber is being cooled while the other is being heated, the heat transfer medium vaporizing in the heat transfer system of the boiler-absorber being heated will condense more rapidly by flowing to the other heat transfer system and will by this circulation prevent overheating of the first mentioned boiler-absorber.

Another method of preventing overheating of the boiler-absorbers is disclosed in Fig. 3 wherein a thermostat valve 50 responsive to the temperature in each of the boiler-absorbers 10 and 10' by means of thermostat bulbs 51 and 51', respectively, operates to shut off the supply of fuel through line 19a into the fuel valve chamber of the control mechanism (not shown) when the temperature in either of the boiler-absorbers rises beyond a predetermined point.

It will thus be seen from the above description of the invention, that I have provided auxiliary control means in combination with the thermostat control mechanism or changing-over device for two or more intermittent absorption refrigerating systems operating in phase relation to each other, which auxiliary control means operate either to permit the flow of the secondary cooling medium in heat exchange relation simultaneously with each of the boiler-absorbers, or to establish communication between the heat transferring system of one boiler-absorber with that of the other boiler-absorber, or to shut off the heat supply to all boiler-absorbers, upon the failure of the changing-over device to operate.

From the foregoing it is believed that the construction, operation and advantages of the present invention will be readily understood by those skilled in the art without further description, it being borne in mind that numerous changes may be made in the details disclosed without departing from the spirit of the invention as set out in the following claims.

What I claim is:

1. In refrigerating apparatus of the intermittent absorption type including two units operating in phase relation to each other and each having a boiler-absorber, the combination including a separate heat transfer system for each of said boiler-absorbers, a heat source for each of said heat transfer systems, thermostat means responsive to the temperature in each of said boiler-absorbers for rendering the source of heat to one of said heat transfer systems ineffective and simultaneously rendering the source of heat to the other heat transfer system effective, and vice versa, whereby each of said boiler-absorbers is heated intermittently and in phase relation to each other, and means responsive to the pressure in each of said heat transfer systems and operative at a predetermined pressure attained upon failure of said thermostat means to operate, for preventing overheating of the boiler-absorber being heated.

2. In refrigerating apparatus of the intermittent absorption type including two units operating in phase relation to each other and each having a boiler-absorber; the combination including a separate heat transfer system for each of said boiler-absorbers formed by a closed jacket containing a heat transferring medium adapted to vaporize in one portion of the jacket upon application of heat thereto and to condense in another portion of said jacket in heat exchange relation with the corresponding boiler-absorber, heating means for the vaporizing portion of each of said heat transfer systems, thermostat means responsive to the temperature in each of said boiler-absorbers and operative at a predetermined temperature attained during the generating periods of each of said units, to control the application of heat to the vaporizing portion of each of said heat transfer systems intermittently and in phase relation to each other, and means responsive to the pressure in each of said heat transfer systems and operative at a predetermined pressure attained upon failure of said thermostat means to operate, to prevent overheating of said boiler-absorbers.

3. In refrigerating apparatus of the intermittent absorption type including two units operating in phase relation to each other and each having a boiler-absorber; the combination including a separate heat transfer system for each of said boiler-absorbers formed by a closed jacket containing a heat transferring medium adapted to vaporize in one portion of the jacket upon application of heat thereto and to condense in another portion of said jacket in heat exchange relation with the corresponding boiler-absorber, heating means for the vaporizing portion of each of said heat transfer systems, thermostat means responsive to the temperature in each of said boiler-absorbers and operative at a predetermined temperature attained during the generating periods of each of said units, to control the application of heat to the vaporizing portion of each of said heat transfer systems intermittently and in phase relation to each other, and means responsive to the pressure in each of said heat transfer systems and operative at a predetermined pressure attained upon failure of said thermostat means to operate, to place the vaporizing portion of each of said heat transfer systems in fluid communication with each other.

4. In refrigerating apparatus of the intermittent absorption type including two units operating in phase relation to each other and each having a boiler-absorber; the combination of a separate heat transfer system for each of said boiler-absorbers, heating means for each of said heat transfer systems, conduit means to flow a cooling medium in heat exchange relation with each of said boiler-absorbers to cool the latter, valve means controlling the flow of cooling medium through said conduit means, thermostat mechanism responsive to the temperature in each of said boiler-absorbers and cooperating with said heating means and valve means to control the heating and cooling alternately of each of said boiler-absorbers in phase relation to each other, and separate means responsive to the pressure in each of said heat transfer systems, respectively, and each operative at a predetermined pressure attained during the heating of the corresponding boiler-absorber and upon failure of said thermostat mechanism to operate, to permit the flow of the cooling medium in heat exchange relation with the boiler-absorber being heated, whereby overheating of the latter is prevented.

5. In refrigerating apparatus of the intermittent absorption type including two units operating in phase relation to each other and each having a boiler-absorber; the combination of a separate heat transfer system for each of said boiler-absorbers, heating means for each of said heat transfer systems, a secondary cooling system formed by a plurality of interconnected elements for the circulation of a cooling medium in heat exchange relation with each of said boiler-absorbers to cool the latter, valve means controlling the flow of the cooling medium through said cooling system, thermostat mechanism responsive to the temperature in each of said boiler-absorbers and cooperating with said heating means and valve means to control the heating and cooling alternately of each of said boiler-absorbers in phase relation to each other at a predetermined temperature attained during the heating of the respective boiler-absorbers, separate conduit means by-passing said valve means for the flow of cooling medium in heat exchange relation with each of said boiler-absorbers, respectively, and pressure operated valve means in each of said conduit means responsive to the pressure in the heat transfer system of the corresponding boiler-absorber, normally preventing the flow of cooling medium through the associated conduit means and operative to open at a predetermined pressure attained upon failure of said thermostat mechanism to operate at the said predetermined temperature, to permit the flow of the cooling medium through said conduit means into heat exchange relation with the boiler-absorber being heated, whereby overheating of the latter is prevented.

6. In refrigerating apparatus of the intermittent absorption type including two units operating in phase relation to one another and each having a boiler-absorber adapted to be heated during the generating and cooled during the absorbing periods thereof; the combination of heating means including heat source and separate heat transfer systems for transferring heat from the heat source to each of said boiler-absorbers, respectively, by vaporization of a heat transferring medium under the influence of the heat source and condensation of the heat transferring medium in heat exchange relation with the corresponding boiler-absorber; cooling means including a heat transfer system formed by a plurality of interconnected elements for removing the heat from each of said boiler-absorbers by vaporization of a heat transferring medium in heat transfer relation to the corresponding boiler-absorber and dissipating such heat by condensation of the heat transferring medium; control mechanism acted upon by changes in conditions in each of said boiler-absorbers and operable intermittently at a predetermined condition attained during the generating periods of each of said units, respectively, to control the heat source to each of said first named heat transfer systems and including means simultaneously controlling the circulation of the heat transferring medium in said second named heat transfer system whereby to control the intermittent heating and alternate cooling of each of said boiler-absorbers in phase relation to each other; and pressure operated means responsive to the pressure in each of said first named heat transfer systems and operative at a predetermined pressure attained in the heat transfer system of the boiler-absorber being heated upon failure of said control mechanism to operate, for permitting the heat transferring medium of one of said first named and second named heat transfer systems to circulate both in heat transfer relation to the boiler-absorber being heated and in heat transfer relation to a boiler-absorber being cooled.

7. In refrigerating apparatus of the intermittent absorption type including two units operating in phase relation to one another and each having a boiler-absorber adapted to be heated during the generating periods and cooled during absorbing periods thereof; the combination of heating means including a heat source and a separate heat transfer system for transferring heat from the heat source to each of said boiler-absorbers, respectively, by vaporization of a heat transferring medium under the influence of the heat source and condensation of the heat transferring medium in heat exchange relation with the corresponding boiler-absorber; cooling means including a heat transfer system formed by a plurality of interconnected elements for removing the heat from each of said boiler-absorbers by vaporization of a heat transferring medium in heat transfer relation to the corresponding boiler-absorber and dissipating such heat by condensation of the heat transferring medium; control mechanism acted upon by changes in conditions in each of said boiler-absorbers and operable intermittently at a predetermined condition attained during the generating periods of each of said units, respectively, to control the heat source to each of said first named heat transfer systems and including means simultaneously controlling the circulation of the heat transferring medium in said second named heat transfer system whereby to control the intermittent heating and alternate cooling of each of said boiler-absorbers in phase relation to each other; and pressure operated means responsive to the pressure in each of said first named heat transfer systems and operative at a predetermined pressure attained in the heat transfer system of the boiler-absorber being heated upon failure of said control mechanism to operate, for establishing communication between the vaporizing portion of each of said first named heat transfer systems.

8. In refrigerating apparatus of the intermittent absorption type including two units operating in phase relation to one another and each having a boiler-absorber adapted to be heated during the generating periods and cooled during the absorbing periods thereof; the combination of heating means including a heat source and a separate heat transfer system for transferring heat from the heat source to each of said boiler-absorbers, respectively, by vaporization of a heat transferring medium under the influence of the heat source and condensation of the heat transferring medium in heat exchange relation with the corresponding boiler-absorber; cooling means including a heat transfer system formed by a plurality of interconnected elements for removing the heat from each of said boiler-absorbers by vaporization of a heat transferring medium in heat transfer relation to the corresponding boiler-absorber and dissipating such heat by condensation of the heat transferring medium; control mechanism acted upon by changes in conditions in each of said boiler-absorbers and operable intermittently at a predetermined condition attained during the generating periods of each of said units, respectively, to control the heat source to each of said first named heat transfer systems and including means simultaneously controlling the circulation of the heat transferring medium in said second named heat transfer system whereby to control the intermittent heating and alternate cooling of each of said boiler-absorbers in phase relation to each other; and pressure operated means responsive to the pressure in each of said first named heat transfer systems and operative at a predetermined pressure attained in the heat transfer system of the boiler-absorber being heated upon failure of said thermostat mechanism to operate, for permitting the heat transferring medium of said second named heat transfer system to circulate in heat transfer relation to the boiler-absorber being heated and to a boiler-absorber being cooled.

9. Absorption type refrigerating apparatus including a boiler-absorber having alternate heating and cooling periods, heating means for said boiler-absorber including a heater and a heat transfer system, cooling means for said boiler-absorber including a conduit for cooling fluid and a valve controlling flow of the cooling fluid through the conduit, control means operating to shut off said heater and open said valve at the end of each heating period and to turn on said heater and close said valve at the end of each cooling period, auxiliary conduit means arranged to conduct fluid in such a manner as to remove heat from said boiler-absorber during a heating period, and means acted upon by pressure change in said heat transfer system normally preventing flow of liquid in said auxiliary conduit means and operative at a predetermined pressure attained in said system upon failure of said control means to shut off the heater at the end of a heating period to permit flow of fluid in said auxiliary conduit means.

10. Absorption type refrigerating apparatus including a boiler-absorber having alternate heating and cooling periods, heating means for said boiler-absorber including a heater and a heat transfer system, cooling means for said boiler-absorber including a heat transfer system, and a valve controlling circulation of the heat transferring fluid in said system, control means operating to shut off said heater and open said valve at the end of each heating period and to turn on said heater and close said valve at the end of each cooling period of said boiler-absorber, conduit means arranged to flow a heat transferring fluid in such a manner as to remove heat from said boiler-absorber during a heating period, and means acted upon by pressure change in said first-named heat transfer system normally preventing the flow of the heat transferring fluid through said conduit means and operative at a predetermined pressure attained in said system upon failure of said control means to shut off the heater at the end of a heating period to permit flow of the heat transferring fluid through said conduit means.

11. Absorption type refrigerating apparatus including a boiler-absorber having alternate heating and cooling periods, heating means for said boiler-absorber including a heater and a heat transfer system, cooling means for said boiler-absorber including a heat transfer system and a valve controlling the circulation of the heat transferring fluid in said system, control means operating to shut off said heater and to open said valve at the end of each heating period and to turn on said heater and close said valve at the end of each cooling period of said boiler-absorber, auxiliary conduit means arranged for the flow of the heat transferring fluid of one of said first and second-named heat transfer systems in such a manner as to remove heat from said boiler-absorber during a heating period, and means acted upon by pressure change in said first-named heat transfer system normally preventing flow of the heat transferring fluid through said conduit means and operative at a predetermined pressure attained in said system upon failure of said control means to shut off the heater at the end of a heating period to permit flow of the heat transferring fluid through said auxiliary conduit means.

12. Absorption type refrigerating apparatus including a boiler-absorber having alternate heating and cooling periods, heating means for said boiler-absorber including a heater and a heat transfer system, cooling means for said boiler-absorber including a heat transfer system and a valve controlling the circulation of the heat transferring fluid in said system, control means operating to shut off said heater and to open said valve at the end of each heating period and to turn on said heater and close said valve at the end of each cooling period of said boiler-absorber, auxiliary conduit means arranged for the flow of the heat transferring fluid of said first-named heat transfer system in such a manner as to remove heat from said boiler-absorber during a heating period, and means acted upon by pressure change in said first-named heat transfer system normally preventing flow of the heat transferring fluid through said auxiliary conduit means and operative at a predetermined pressure attained in said system upon failure of said control means to shut off the heater at the end of a heating period to permit flow of the heat transferring fluid through said auxiliary conduit means.

13. Absorption type refrigerating apparatus including a boiler-absorber having alternate heating and cooling periods, heating means for said boiler-absorber including a heater and a heat transfer system, cooling means for said boiler-absorber including a heat transfer system and a valve controlling the circulation of the heat transferring fluid in said system, control means operating to shut off said heater and to open said valve at the end of each heating period and to turn on said heater and close said valve at the end of each cooling period of said boiler-absorber, auxiliary conduit means by-passing said valve and arranged for the flow of the heat transferring fluid of said second-named heat transfer system in such a manner as to remove heat from said boiler-absorber during a heating period, and valve means in said auxiliary conduit means acted upon by pressure change in said first-named heat transfer system normally closed to prevent flow of the heat transferring fluid through said auxiliary conduit means and operative to open at a predetermined pressure attained in said system upon failure of said control means to shut off the heater at the end of a heating period to permit flow of the heat transferring fluid through said auxiliary conduit means.

14. In absorption type refrigerating apparatus including two units having alternate generating and absorbing periods and each unit including a boiler-absorber adapted to be heated during the generating periods and cooled during the absorbing periods thereof; the combination of heating means for each boiler-absorber including a heater and a heat transfer system, cooling means for each boiler-absorber, control means alternately operating said heating means and cooling means of one of said units and simultaneously and alternately operating the cooling means and heating means of the other one of said units, auxiliary conduit means arranged for the flow of a heat transferring fluid in such a manner as to remove heat from a boiler-absorber being heated, and means acted upon by pressure change in the heat transfer system of each boiler-absorber normally preventing flow of the heat transferring fluid through said auxiliary conduit means and operative at a predetermined pressure attained in the heat transfer system of a boiler-absorber being heated and upon failure of said control means to operate to permit flow of the heat transferring fluid through said auxiliary conduit means.

NILS ERLAND AF KLEEN.